United States Patent [19]

Yoshida et al.

[11] Patent Number: 4,762,670

[45] Date of Patent: Aug. 9, 1988

[54] CLEANING APPARATUS FOR ATOMIC REACTOR CONTROL ROD DRIVING MEANS (CRD)

[75] Inventors: Tomiharu Yoshida, Katsuta; Tatsuyuki Omote, Hitachi; Yoshimi Ishii, Kitaibaraki; Kiyoshi Izumi, Hitachi, all of Japan

[73] Assignee: Hitachi, Ltd., Tokyo, Japan

[21] Appl. No.: 741,523

[22] Filed: Jun. 5, 1985

[30] Foreign Application Priority Data

Jun. 7, 1984 [JP] Japan ................................ 59-116849

[51] Int. Cl.⁴ .......................................... G21C 19/32
[52] U.S. Cl. .................................. 376/313; 376/310; 376/316; 134/111; 134/153; 134/170
[58] Field of Search ............... 376/260, 310, 309, 313, 376/316, 315; 134/111, 153, 170

[56] References Cited

U.S. PATENT DOCUMENTS 4,483,205 11/1984 Bellaiche et al. ............... 376/313 X

FOREIGN PATENT DOCUMENTS 21492 2/1985 Japan ................... 376/260

Primary Examiner—John F. Terapane
Assistant Examiner—John S. Maples
Attorney, Agent, or Firm—Antonelli, Terry & Wands

[57] ABSTRACT

A cleaning apparatus for atomic reactor control rod driving means (CRD) comprises a water tub for washing a CRD, rails laid within the water tub, a truck for loading the CRD installed on the rails, a CRD clamp unit mounted on the truck having means for rotating the CRD in the circumferential direction as well as for clamping the CRD, a CRD disassembling and assembling grapple unit installed within the water tub to clamp the CRD and move the same sideways, an outer-surface washing nozzle for washing an outer tube surface and strainer of the CRD, a lance installed within the water tub, which is insertable into the tubes of the CRD and which is equipped with a nozzle assembly to spray the washing water onto the inner surface of the tubes, a filter washing nozzle unit installed within the water tub to spray the washing water onto a cylindrical filter of the CRD, a washing-water circulating pipe connected to the water tub, and a filter unit provided on a portion of the pipe, to filter the washing water.

4 Claims, 20 Drawing Sheets

CLEANING APPARATUS FOR ATOMIC REACTOR CONTROL ROD DRIVING MEANS (CRD)

FIELD OF THE INVENTION AND RELATED ART STATEMENT

The present invention relates to a cleaning apparatus for washing and disassembling an atomic reactor control rod driving means (hereinafter abbreviated as "CRD") and, more particularly, to a cleaning apparatus for washing and disassembling a CRD having a multitubular structure.

A conventional CRD maintenance and inspection operation is roughly classified into the following two operations.

(1) CRD replacing operation
(2) CRD disassembling, washing and assembling operations These operations (1) and (2) are manually performed and have the following drawbacks. That is, among all the maintenance/inspection operations for a boiling water reactor, they are performed under the worst operation conditions, need the longest operation period of time and the largest number of workmen, and expose the workmen to radiation in the largest amount.

Even at the present stage, however, the "CRD replacing operation" has already been greatly improved by applying a remotely controlled CRD replacing means. Thus, a subsequent urgent improvement has now been demanded in the "CRD disassembling, washing and assembling operations". In this regard, an automatic washing apparatus has been proposed in Japanese Patent Unexamined Publication No. 56-89097. The cleaning apparatus disclosed in the Publication includes a water tub, a filter washing nozzle unit for washing the filter of the CRD, a strainer washing nozzle unit, a truck, clamp unit mounted on the truck, grapple units mounted on the water tub, an outer-surface washing nozzle and an inner-surface washing nozzle. However, the apparatus is not sufficiently automatic. Japanese Patent Unexamined Publication No. 58-33198 discloses an inner-surface washing means including a lance provided with a nozzle at the tip end thereof, Japanese Patent Unexamined Publication No. 58-60288 discloses a truck for loading a CRD including clamp units, Japanese Patent Unexamined Publication No. 58-61495 discloses a grapple unit mounted on the water tub and Japanese Patent Unexamined Publication No. 58-62587 discloses a filter washing nozzle unit to spray washing unit onto the filter of CRD. The present invention is directed to improve the apparatus by taking into the above elements.

Another cleaning apparatus has been proposed in Japanese Utility-Model Unexamined Publication No. 58-127396. The apparatus comprises a water tub for receiving a CRD, a filter washing device disposed in the water tub, a parts-handling device moving the CRD in longitudinal direction thereof while rotating the CRD in circumferential direction and disassembling the CRD and a conveyor moving the parts handling device above the water tub in longitudinal direction thereof.

OBJECT AND SUMMARY OF THE INVENTION

The object of the present invention is to shorten the operation time period, reduce the operation labor used and reduce the amount of the radiation exposure by making most of the CRD disassembling and washing operation automatic.

To attain the above object, according to the present invention, there is provided a CRD cleaning apparatus comprising a water tub for washing a CRD, rails laid within the water tub, a truck for loading the CRD, which is installed on the rails, a CRD clamp unit mounted on the truck, which has means for rotating the CRD in the circumferential direction as well as for clamping the CRD, a CRD disassembling and assembling graple unit installed within the water tub, which is intended to clamp the CRD and move the same sideways, an outer-surface washing nozzle for washing an outer tube surface and strainer of the CRD, a lance installed within the water tub, which is insertable into the tubes of the CRD and which is equipped with a nozzle assembly intended to spray the washing water onto the inner surface of the tubes, a filter washing nozzle unit installed within the water tub, which is intended to spray the washing water onto a cylindrical filter of the CRD, a washing-water circulating pipe which is connected to the water tub, and a filter unit provided on a portion of the pipe, which is intended to filter the washing water.

DETAILED DESCRIPTION OF THE PREFERRED EMBODIMENTS

Figure 1:
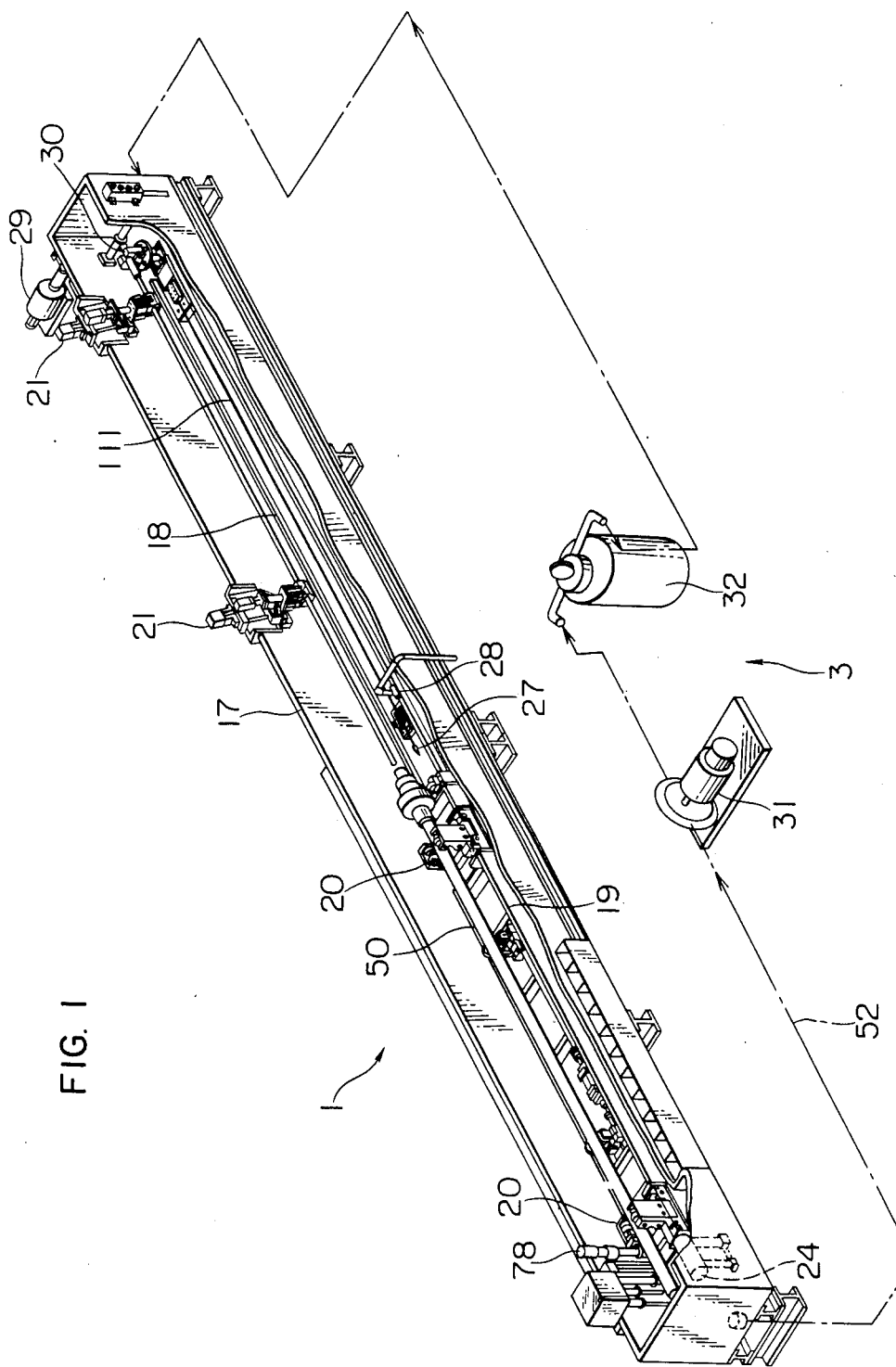
FIG. 1 is a perspective view, partially cut away, of a main body of a CRD cleaning apparatus in accordance with the invention.

Referring now to FIG. 1, a CRD (atomic reactor control rod driver) cleaning apparatus has a main body portion 1 having a water tub 17 in which a CRD is received. Within the water tub 17, rails 18 are laid which are intended to mount a truck 19 for loading the CRD. On the rails 18, this truck 19 is mounted. A motor 29 is mounted on the outer side of the water tub 17 so as to cause the truck 19 to be reciprocatingly moved in the longitudinal direction of the water tub 17. At both end postions of the truck 19, a pair of CRD clamp units 20 are provided, respectively, each of which has means not only to clamp the CRD but also to rotate the same. On the right side of the water tub 17 as viewed in FIG. 1, two grapple units 21 are provided which are intended to grapple the CRD body or parts to move to a position at which they do not become obstacles to performing the washing operations and at the bottom portion of the water tub 17, a lance 111 which is used to wash the inner surfaces of the CRD is provided. At the left end portion of the water tub 17 there is provided a filter washing nozzle unit 24 intended to wash the filter device of the CRD. An outer-surface washing nozzle 28 is provided at the substantially central portion of the water tub 17 and this nozzle unit is intended to wash a strainer and outer tube surface of the CRD. A drawing-out/clamping unit 30 is provided at the right end portion of the water tub 17, said unit 30 being intended to fix a tube when tubes are drawn out from the CRD having a multi-tube structure to thereby disassemble into each of tubes. Further, the water tub 17 is connected, by a pipe line 52, to a circulating means 3 comprising a pump 31 and a filter 32, whereby the washing water is subjected to circulating use after clads are removed therefrom by the filter device 32.

Figure 2:
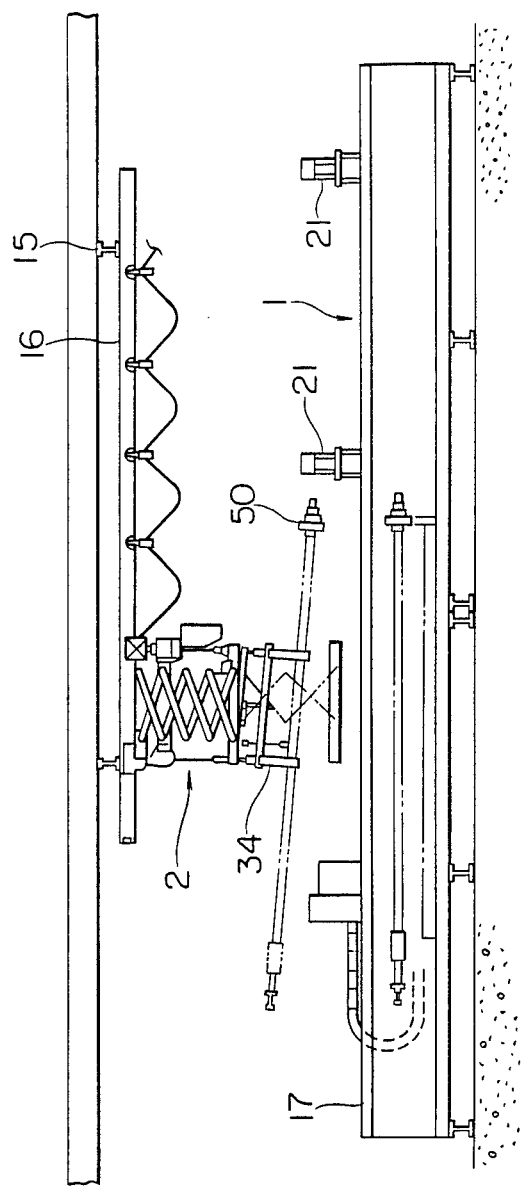
FIG. 2 is a schematic front view of the CRD cleaning apparatus in accordance with the invention.
Figure 3:
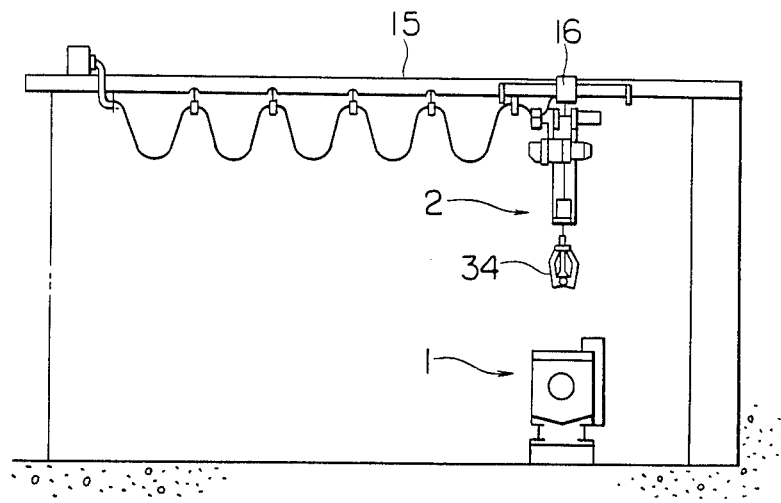
FIG. 3 is a schematic side view of the CRD cleaning apparatus in accordance with the invention.

The CRD cleaning apparatus includes a CRD handling means 2 as shown in FIGS. 2 and 3. This handling means 2 is suspended from rails 15 and 16 installed above the portion 1 of the CRD cleaning apparatus and is freely movable in the lengthwise and widthwise directions. It is intended to be used for conveyance of the body and parts of the CRD.

Explanation will now be made to the constituent elements of the CRD cleaning apparatus.

Figure 4:
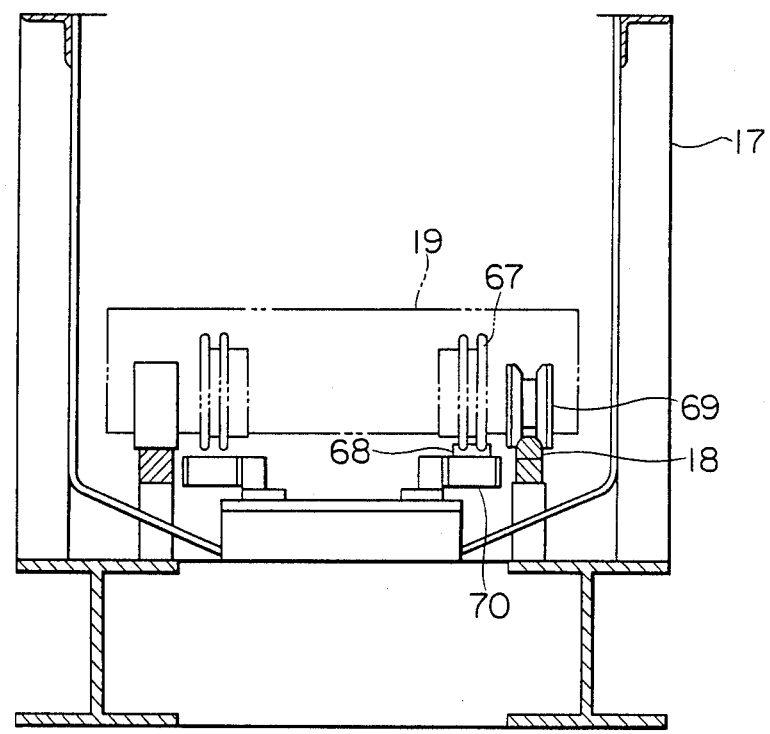
FIG. 4 is a cross-sectional view of a water tub.

The CRD loading truck 19 moves on the rail laid within the water tub 17 as shown in FIG. 4. The rotation of the motor 29 is transmitted to a sprocket 67 and a chain 68 to cause the truck 19 to travel. Reference numeral 69 denotes wheels and reference numeral 70 denotes guide rollers for guiding the chain.

Figure 5:
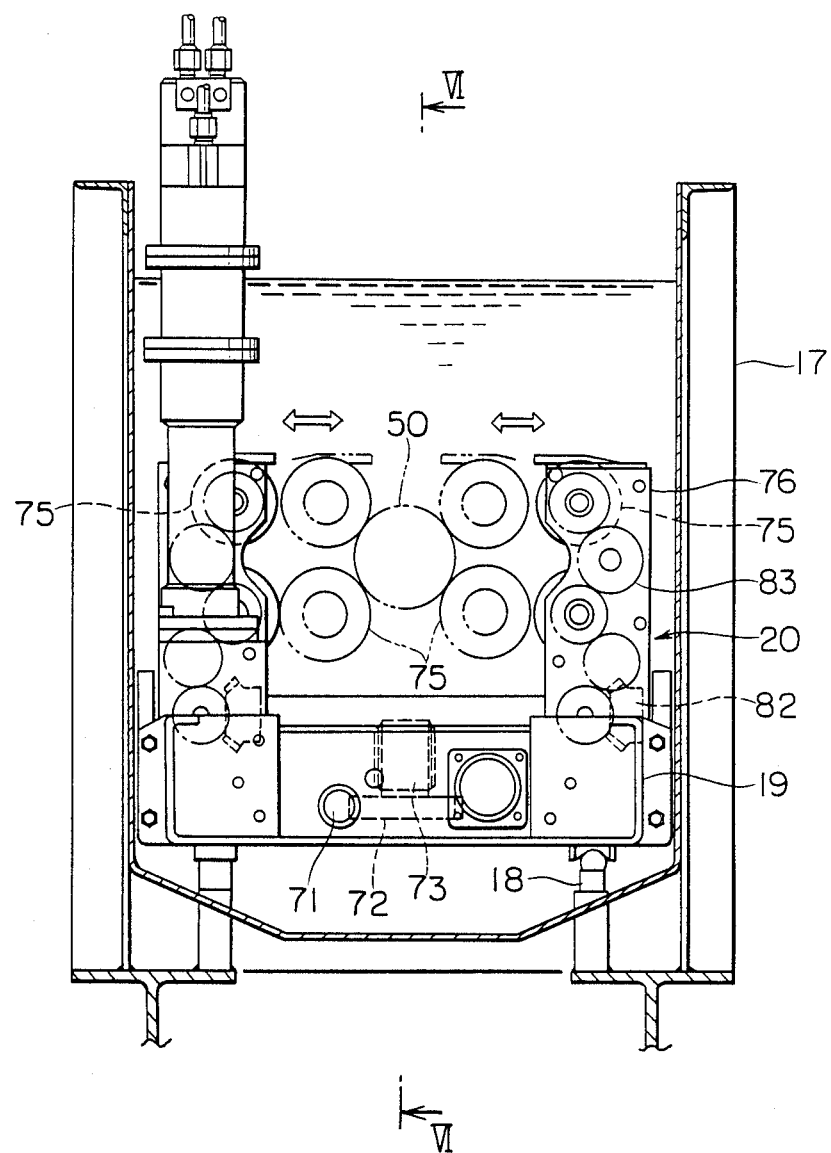
FIG. 5 is a cross-sectional view of the water tub, showing a CRD clamp unit 20.
Figure 6:
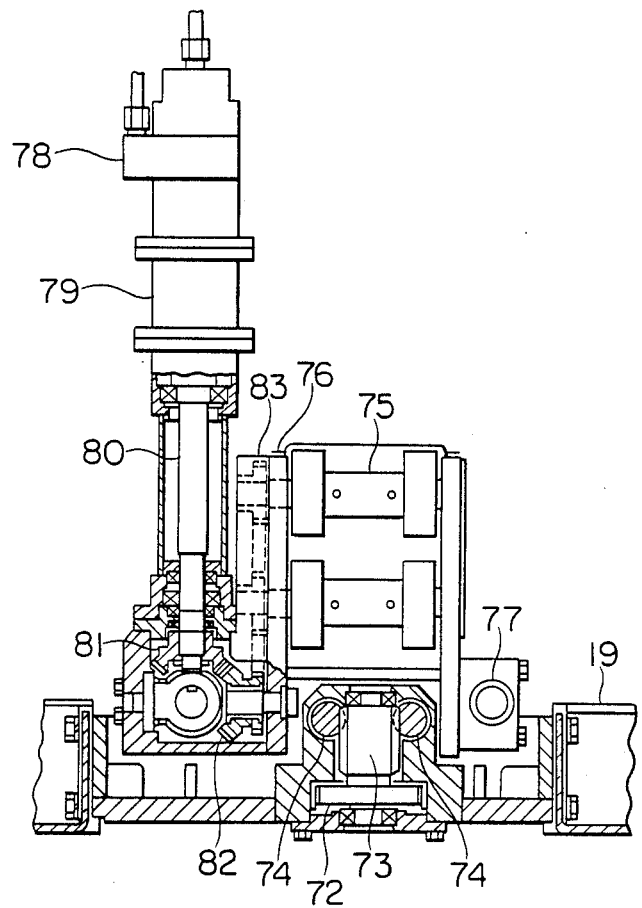
FIG. 6 is a sectional view taken along the line VI—VI of FIG. 5.
Figure 7:
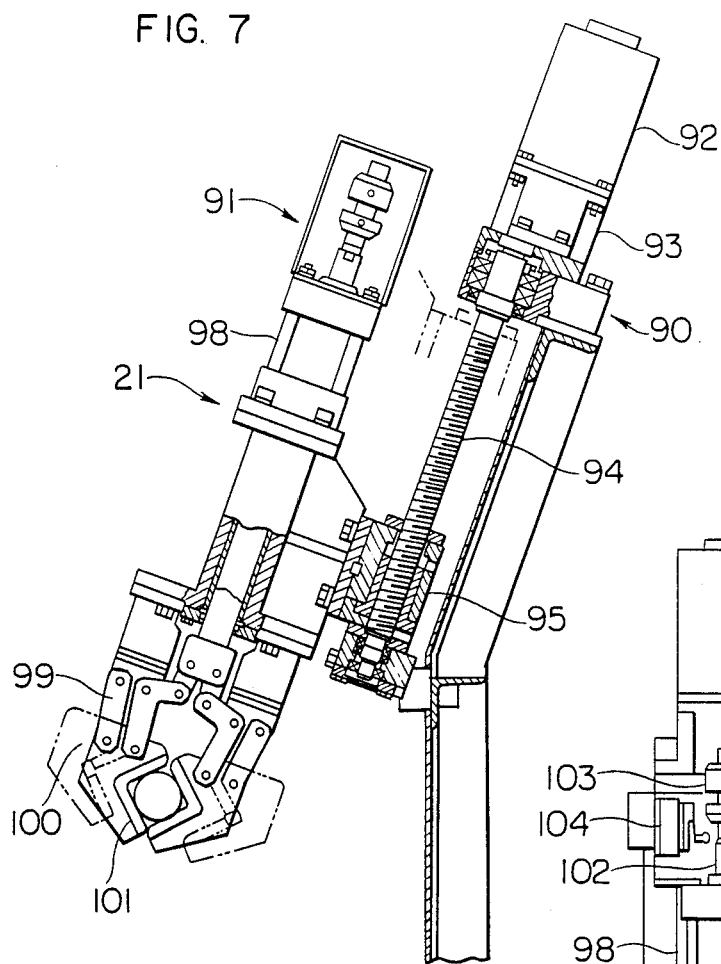
FIG. 7 is a side view of a grapple unit 21.
Figure 8:
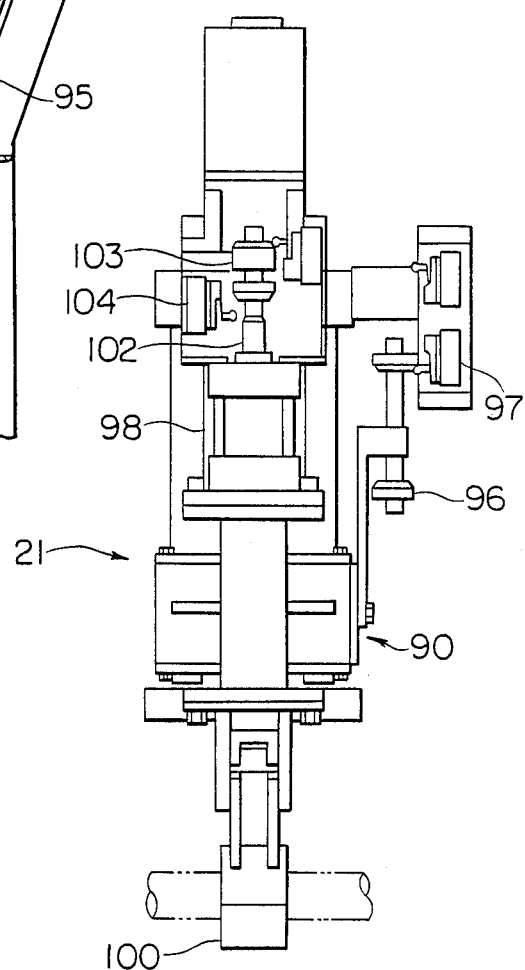
FIG. 8 is a front view of the grapple unit 21.

Each clamp unit 20 provided on the CRD loading truck 19 can clamp various tubes of different diameters by reciprocating motions of brackets equipped with rollers which are arranged at the right and left sides. That is, the reciprocating motion of a cylinder of the clamp unit is converted into a circular motion by cooperation of a rack with a pinion. Then, this circular motion is converted into rectilinear motions in two opposite directions by operation of a rack and pinion mechanism. Thus, the brackets perform their gripping and releasing operation. As the rollers clamping the article to be washed are rotated, this article is allowed to rotate. Reference will now be made to the clamping and rotating mechanism by using FIGS. 5 and 6. When the cylinder makes its reciprocating motion, the pinions 72 and 73, which are intermeshed with the rack 71 directly connected to the cylinder so as to be reciprocatingly moved by the cylinder, rotate. The rotary motion of the pinion 73 is converted into a rectilinear motion of the racks 74 intermeshed therewith, whereby brackets 76 rotatably supporting guide rollers 75 are slided on guide rods 77. The racks 74 intermeshed with the pinion 73 are provided one pair in number, so that the brackets 76 make their reciprocating motions in their mutually opposite directions as the pinion 73 rotates. Thus, the CRD clamp unit 20 clamps the article to be washed by means of the guide rollers 75. The unit 20 performs its clamping and releasing operations as indicated in FIG. 5 by arrows. The positions shown in solid lines correspond to a state wherein the article has been released. The positions shown in two-dot and dash lines correspond to a state of clamping the article. The rotation of the article is made by rotation of an air motor 78. This rotation of the air motor is transmitted to bevel gears 81, 82 and a group of gears 83 via a shaft 80 connected to a reduction mechanism 79, to thereby rotate the guide rollers 75.

The grapple unit 21 provided on the water tub 17 comprises a lifting section 90 and a grappling section 91. The lifting section 90 is constructed such that the rotational force of an air motor 92 is transmitted to a mechanism of screw 94 and nut 95 via a reduction mechanism 93 to thereby raise or lower the grappling section 91. Numeral 96 denotes a striker and numeral 97 a position detector. The grappling section 91 causes its clamping pieces 100 to clamp by a clamping cylinder 98 and link mechanism 99. Numeral 101 denotes jaws. The grappling and releasing operation is confirmed through cooperation of a striker 103 mounted on a piston 102 of the grappling cylinder 98 with a position detector 104.

Figure 9:
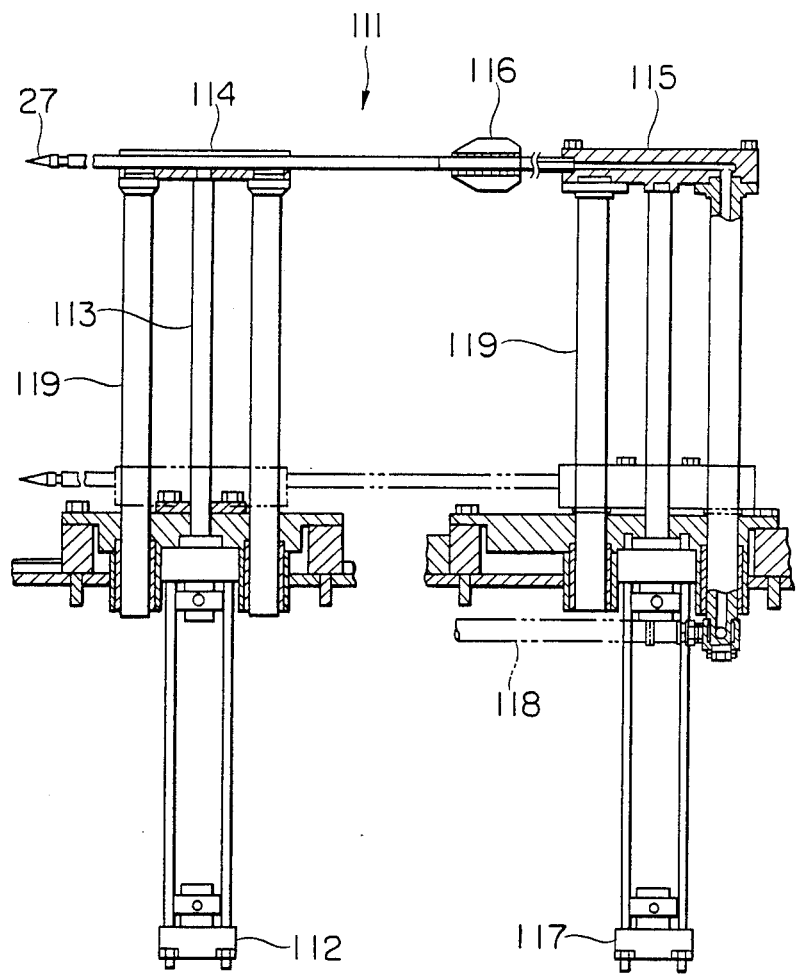
FIG. 9 is a front sectional view of a lance.

The lance 111 provided at the rightward bottom portion of the water tub 17 has an inner tube surface washing nozzle 27 at its fore end (FIG. 9). A high pressure water is ejected from this nozzle 27 onto the inner surface of the tube. By causing the truck 19 having the CRD tube loaded thereon to travel while the tube is being rotated, the inner tube surface is washed over its entire length. During the other washing operation, the lance 111 is retreated, by air cylinders 112, 117 up to a position wherein it has no interference with the truck 19. Only when the inner tube surface is washed, a lance is raised up to a position in alignment with a center of the tube. When the fore end of the lance 111 is inserted into the tube, the air cylinder 112 is retreated, so that the lance holder 114 is retreated. The lance 111 is supported at one end by the tube and at the other end by a retainer 115. When the high pressure water is ejected from the nozzle 27, the lance 111 is brought to the center of the tube interior by means of a guide 116 as well as by the reaction of the ejection, to wash the inner tube surface. The air cylinder 117 holds the lance 111 in place during the inner tube surface washing time period. Numeral 118 denotes a high pressure hose. Numeral 119 denotes guide rods. The two-dot and dash line in the FIG. 9 indicates the position of the lance during the non-washing period. That is, during this time period the lance 111 is retreated down to this position so as to have no interference with the CRD loading truck 19.

Figure 10:
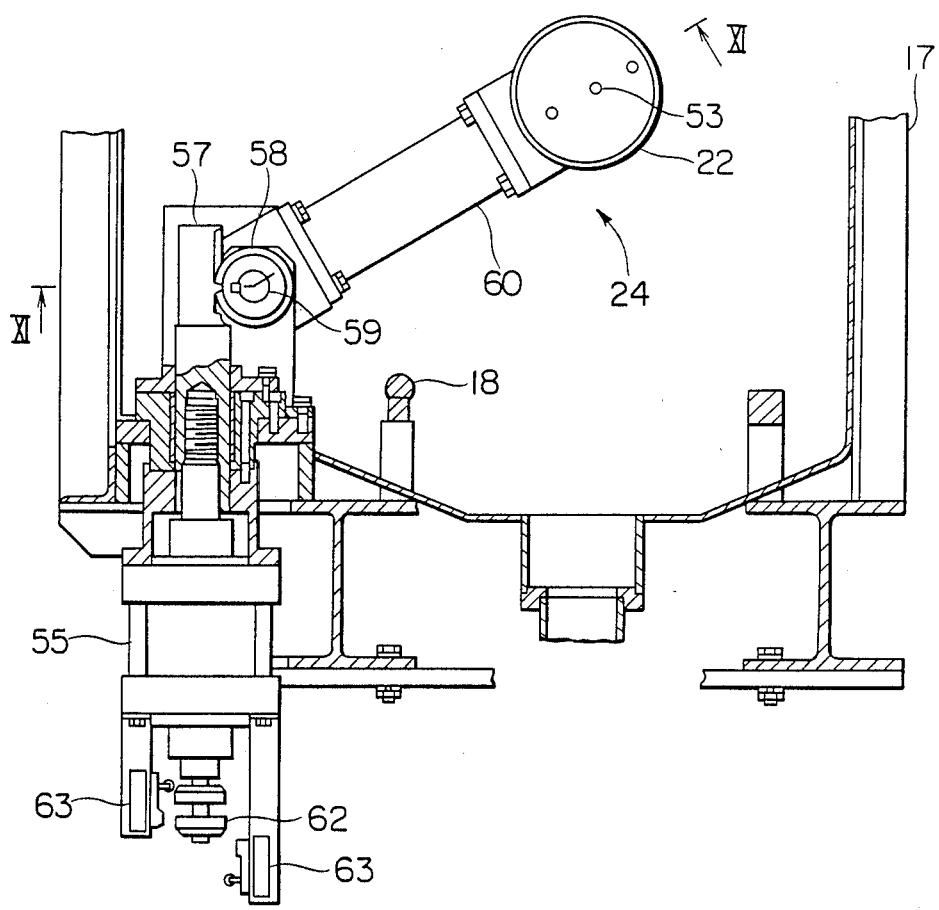
FIG. 10 is a side sectional view of a filter washing nozzle unit.
Figure 11:
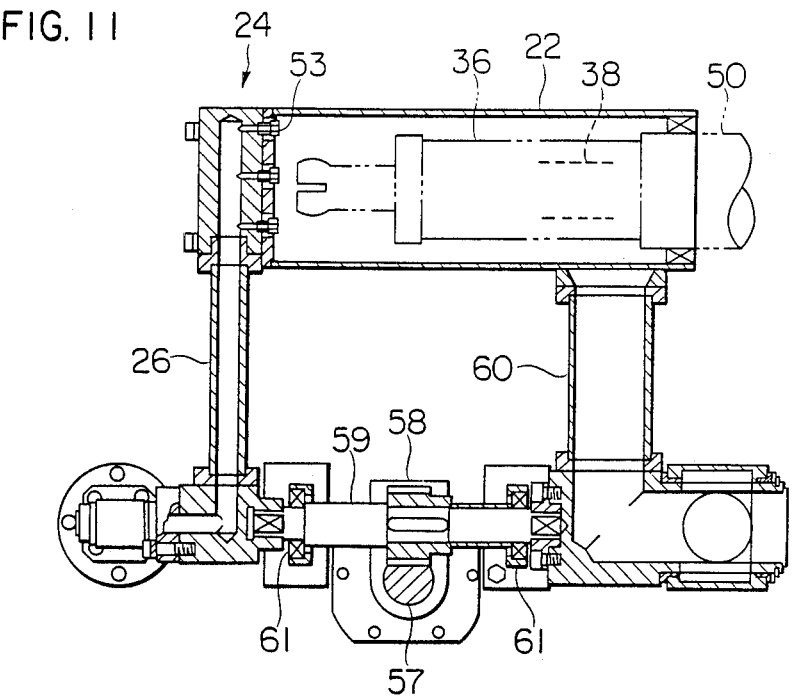
FIG. 11 is a sectional view taken along the line XI—XI of FIG. 10.

The filter washing unit 24 provided at the leftward end portion of the washing tub 17 comprises, as shown in FIGS. 10 and 11, a cap 22 for covering the filter portion of the CRD, a nozzle assembly 53 provided in the cap 22 and intended to eject the washing water, pipe lines 26 for supplying the washing water to the nozzle assembly 53, an arm 60 coupled to the cap 22, a shaft 59 fixed to the arm 60, a pinion 58 integrally coupled to the shaft 59, a rack 57 intermeshed with the pinion 58, and a hydraulic cylinder 55 for driving the rack 57 to move reciprocatingly. Numerals 61 denotes journal bearings, numeral 62 denotes a striker, and numeral 63 denotes a position detector. The filter of the CRD is washed by actuating the hydraulic cylinder 55, rotating the pinion 58, rocking the cap 22 to the position of the filter, moving the CRD loaded on the truck 19, thereby setting the unit 24 as shown in FIG. 11, and ejecting the washing water from the nozzles of the nozzle assembly 53. The cap 22 is intended to prevent the washing water from scattering. It substantially encloses the filter section of CRD and is provided with a discharge port (not shown). During the nonwashing time period, the filter washing unit 24 is rocked to a position at which it does not hinder the other washing operation. The outer surface washing nozzle unit 28 provided at the substantially central portion of the water tub 17, which is intended to wash the strainer and outer tube surface of CRD, washes the strainer by spraying a high pressure water.

The outer surface of tube of CRD is washed by spraying the high pressure water onto the outer tube surface from the nozzle unit 28. That is, it is washed as such over its entire length by causing a travel of the truck 19 having the CRD tube loaded thereon while this tube is being rotated.

Figure 12:
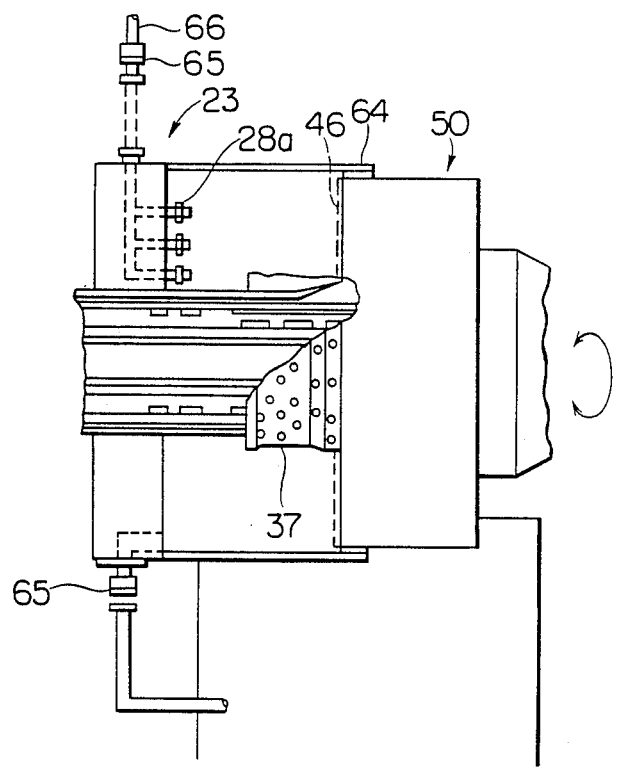
FIG. 12 is a front sectional view of a strainer washing nozzle unit.

In this embodiment, the strainer and tube of CRD are washed by the same nozzle unit 28. In the present invention, however, a strainer washing nozzle unit 23 such as that which is shown in FIG. 12 may be provided. It includes a pair of half covers 64, a nozzle assembly 28a, a pair of couplings 65 and a high pressure hose 66. The unit 23 is set to cover the strainer 37, said pair of covering members 64 being fixed by lock means, whereby the high pressure water is ejected from nozzles of the nozzle assembly 28a to roughly wash an O-ring spacer 46 as well as the interior of the strainer 37.

Figure 14:
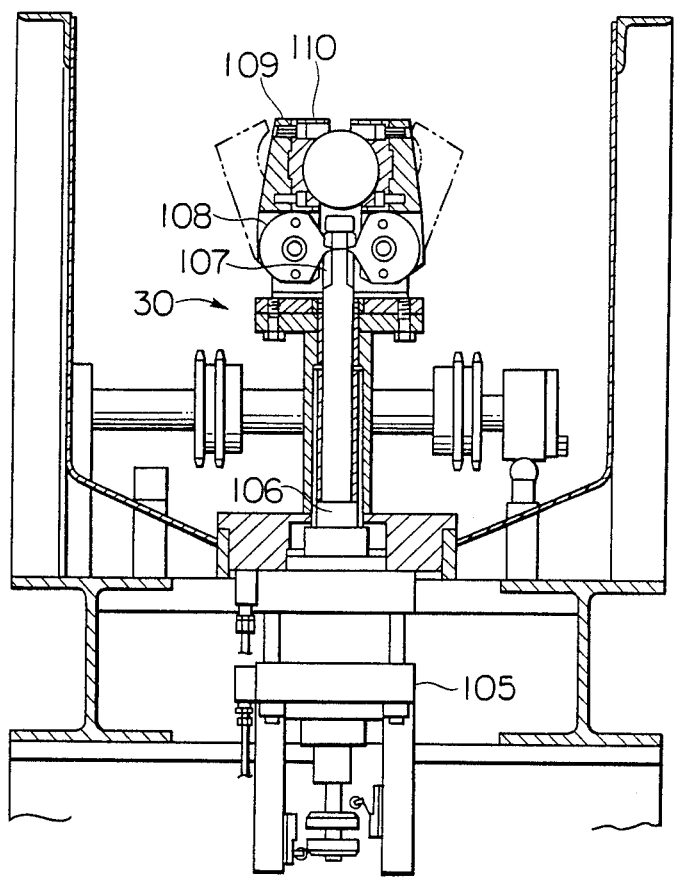
FIG. 14 is a sectional view taken along the line XIV—XIV of FIG. 13.
Figure 13:
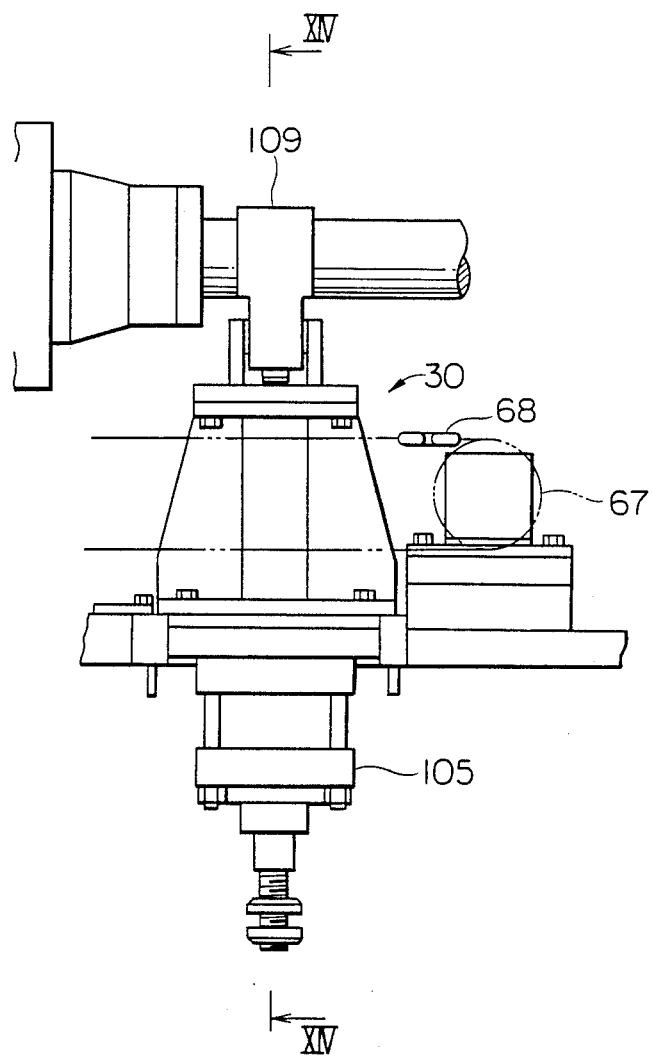
FIG. 13 is a front view of a drawing-out clamp unit.

The drawing-out of an article to be washed from the multi-tube structure of the CRD is performed by the drawing-out/clamping unit 30 shown in FIGS. 13 and 14. After the article or tube has been clamped by the drawing-out/clamping unit 30, it is drawn out by the travelling of the CRD loading truck 19. The unit 30 comprises an air cylinder 105, rack 107, pinions 108 and brackets 109. The reciprocating motions of the cylinder 105 is converted into circular motions of the pinions 108 intermeshed with the rack 107 integrally connected with the piston 106, whereby the brackets 109 disposed at the right and left sides, respectively, of the article to be washed perform their clamping and unclamping operations. FIG. 14 shows a state of clamping the article. The position indicated in two-dot and dash line corresponds to a state of releasing the article. Numeral 110 denotes a pair of clamping jaws.

Figure 15:
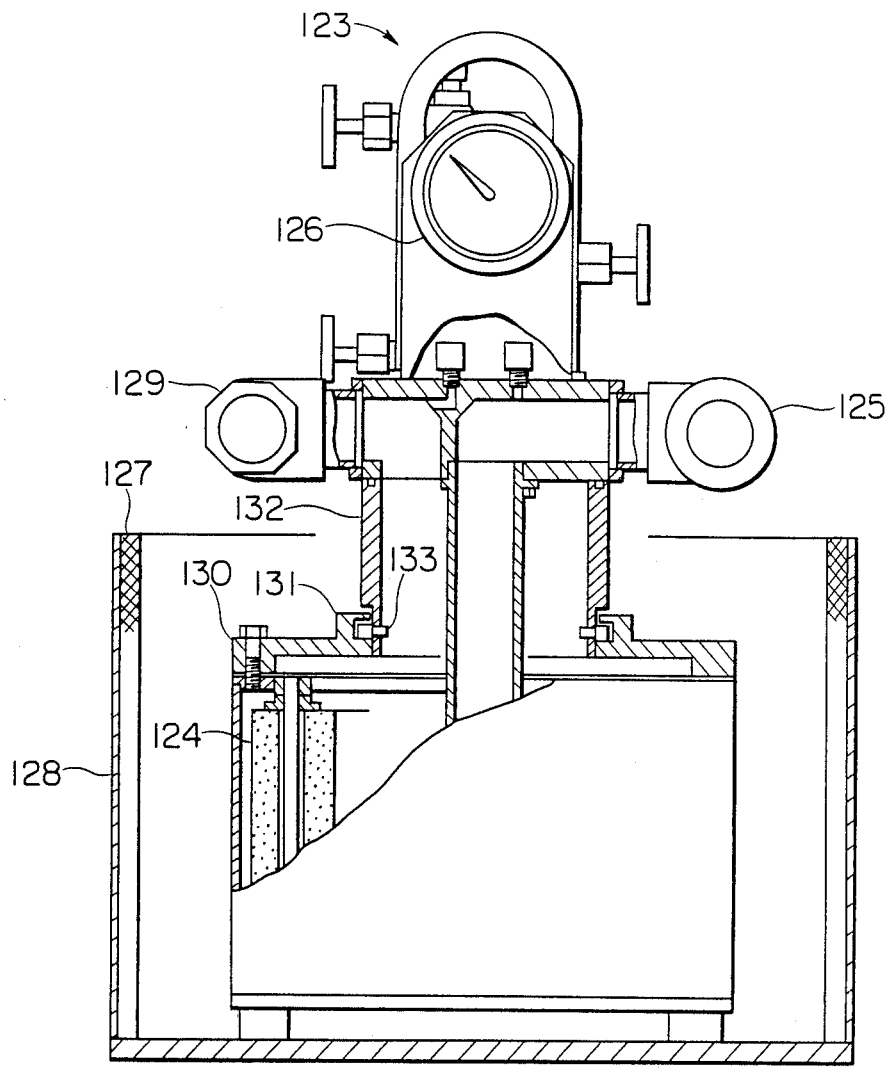
FIG. 15 is a front sectional view of a filter unit provided on a circulating means.

The filter device 32 of the circulating means 3 used to subject the washing water to use by circulation is provided with a filter unit 123 shown in FIG. 15, which is intended to collect clads from the washing water. The filter unit 123 comprises a filter element 124, a pipe line 125 and a differential pressure meter 126. Since the filter element 124 is expected to have a large amount of radiation by collecting the clads, it is received within a casing 128 having a shield 127 on its inner surface. When it has been confirmed by the differential pressure meter 126 that a specified amount of clad has been collected, the filter element 124 is replaced by another one. The filter replacement must be effected in a short time because of a large amount of radiation in the filter element. Namely, it can be effected by first separating the filter casing 128 from the associated pipe lines through a quick coupling 129 and then releasing the engagement between a groove 131 formed in a filter case 130 and a pin 133 provided in a pipe 132 and conveying the casing 128 with the filter case 130 to a predetermined place. Preferably, the casing 128 is connected to the associated pipe lines in condition of being mounted on a truck having castors.

Figure 16:
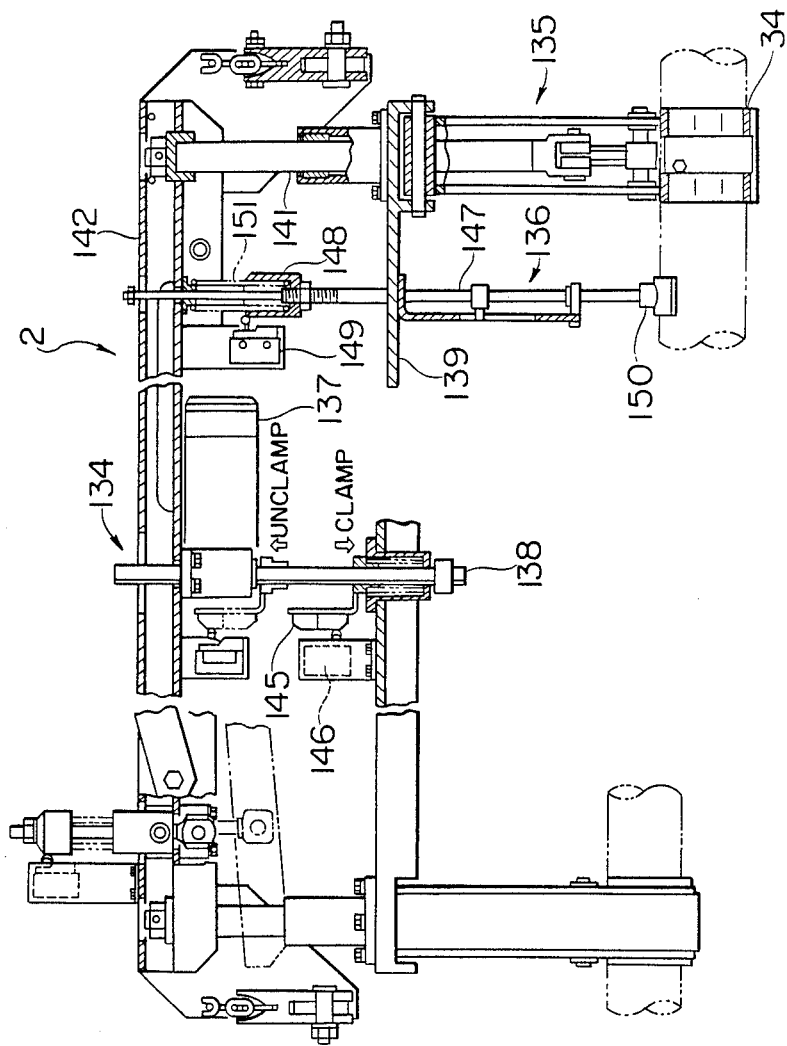
FIG. 16 shows in detail the structure of a CRD handling means.
Figure 17:
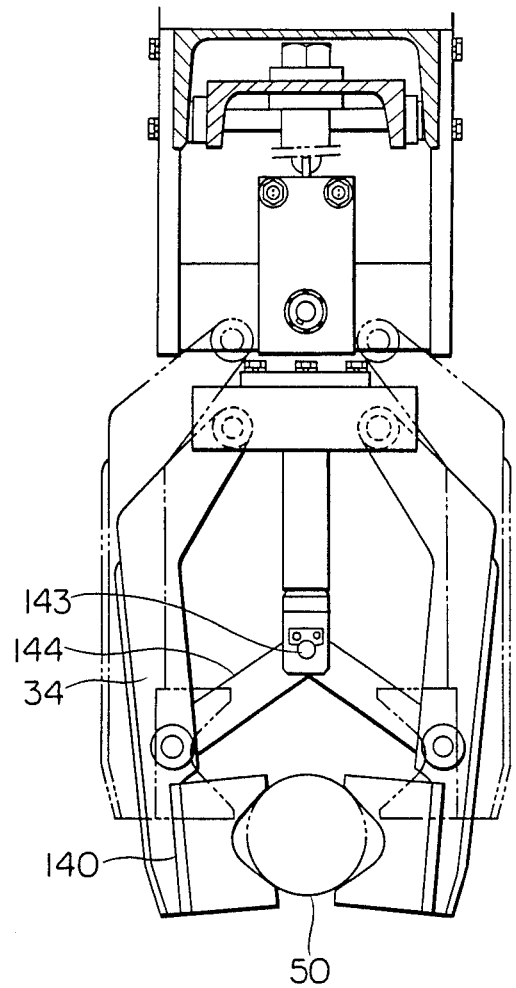
FIG. 17 is a detailed view of a grapple section of the CRD handling means.

Reference will now be made to the CRD handling means 2 with the use of FIGS. 16 and 17. The CRD handling means 2 comprises a driving portion 134, gripping portions 135 and position detector portion 136. The driving portion 134 raises and lowers a rack 138 through operation of a motor 137. A fore end portion of the rack 138 is connected to a beam 139 from which the gripping portions 135 are suspended at the right and left sides, respectively. By a rise and fall of the rack 138, each grapple 34 is opened and closed to unclamp and clamp various tubes. Numeral 140 denotes clamp jaws. FIG. 17 shows a state wherein a CRD tube is clamped. When the rack 138 is raised, the grapple 34 is brought to a state of releasing the tube which is shown in FIG. 17 by two dot chain lines. Guide rods 141 for guiding the beam 139 are fixed at one end to a frame 142 of the CRD handling means 2 and are connected at the other end to links 144 rockable about pins 143, respectively. The position detector 136 is intended to check the gripping of CRD tube or the like as well as the opening and closing of the grapple 34. The opening and closing of the grapple 34 are detected through operation of a striker 145 in cooperation with a position detector 146. The gripping of the CRD or tubes is detected through cooperation of a striker 148 and a position detector 149 which are provided on a rod 147 suspended from the frame 142. The rod 147 passes through the beam 139 to extend downwardly and is mounted at its lower end with an attachment 150 which is brought into contact with the article to be detected. In order to weaken a force of impact of the rod end upon the article to be detected, a spring 151 is provided onto an upper portion of the rod 147. These operations of the position detectors are displayed on an operation panel (FIG. 18) as later described so as to enable them to be stably performed.

The operation of the embodiment having the foregoing construction will now be described.

Figure 18:
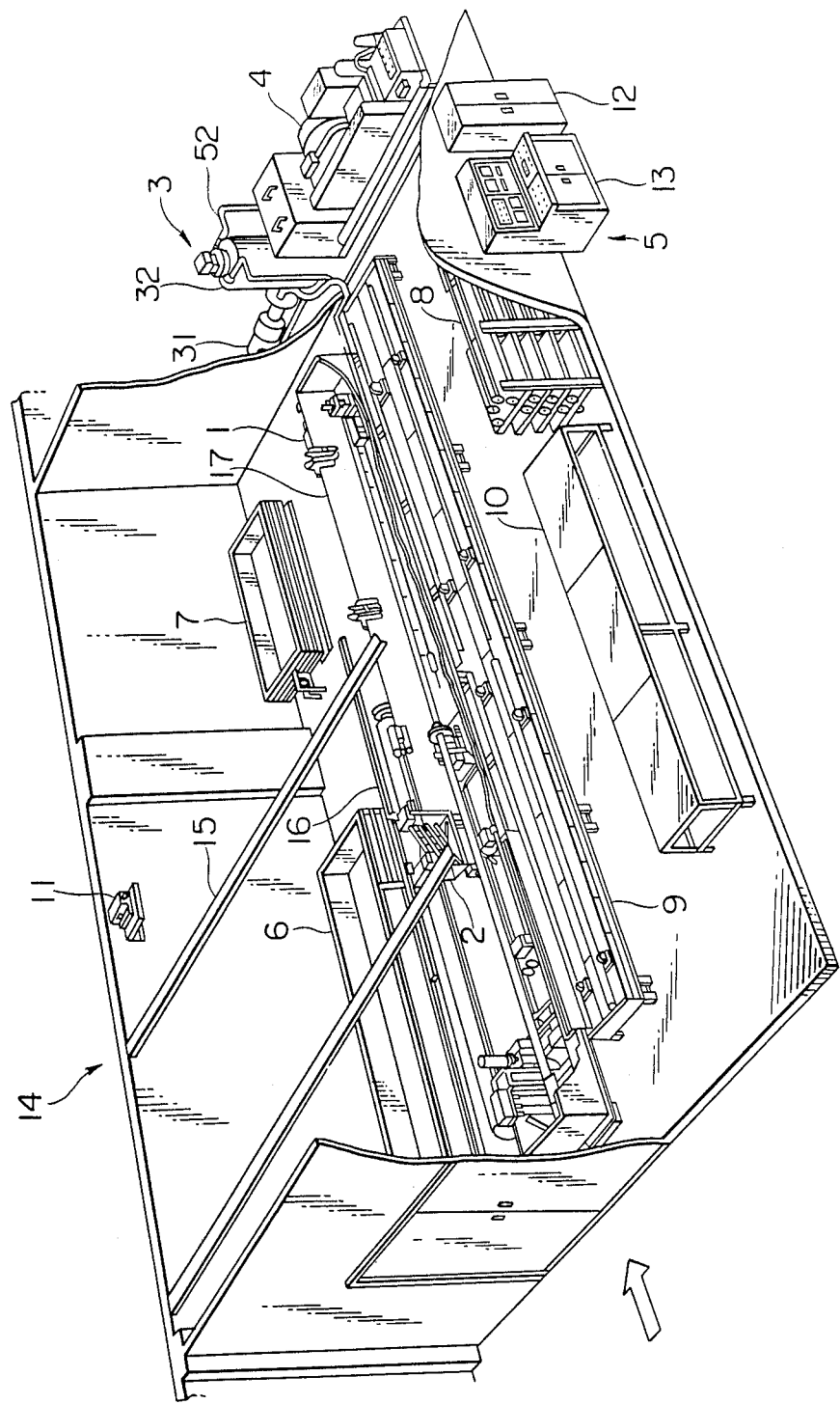
FIG. 18 is a perspective view of a CRD inspection room including the CRD cleaning apparatus in accordance with an embodiment of the invention.

FIG. 18 shows a CRD inspection chamber 14 equipped with the CRD cleaning apparatus according to the above-mentioned embodiment. The CRD inspection chamber 14 comprises the body 1 of the CRD cleaning apparatus, the CRD handling means 2 for carrying the CRD into and out of the apparatus body 1, the circulating means 3 for circulating the washing water to collect the clads, a high pressure water pumping means 4 for ejecting the high pressure water to remove the clads, a control means 5 for making a remote control of the above-mentioned various instruments, a storing water tub 6 for temporarily keeping the CRD in storage, an ultrasonic cleaning tub 7 for mainly cleaning small parts, a CRD storage rack 8 for keeping the cleaned CRD in temporary storage, a working base 9 on which the assembling/inspecting works are performed, a parts placement base 10 on which the parts and tools are temporarily placed, and a television device 11 for monitoring the operations from the control means 5. Numeral 12 denotes a control panel and numeral 13 denotes an operation panel.

The CRD which has been demounted from a pressure reactor vessel by the above-mentioned CRD remotely replacing means is carried, from a direction indicated in FIG. 18 by an arrow, into the CRD inspection chamber 14 by a CRD carrying truck (not shown) constituting one of the constituent elements of the CRD remotely replacing means.

The CRD which has been carried into the CRD inspection chamber 14 is gripped, and lifted upwards from the CRD conveying truck, by the CRD handling means 2 arranged to travel lengthwise and widthwise by way of the rails 15 and 16 installed on the ceiling of the chamber 14. Then, the CRD is set at a specified position of the body 1 of the CRD cleaning apparatus and thereafter is disassembled and washed in accordance with the procedures as described later.

The large parts which have been disassembled and washed are conveyed onto the working base 9 by the CRD handling means 2. The small parts which have been disassembled and washed are manually rewashed in the ultrasonic cleaning tub 7, or are temporarily placed on the parts placement base 10. After visually inspected, they are conveyed onto the working base 9. Thereafter, the large and small parts are assembled and the resultant CRD is subjected to leakage test in its single unit. After inspected and tested as above, the CRD is temporarily received on the CRD storage rack 8 by the use of the CRD handling means 2. Or alternatively, it is loaded on the CRD conveying truck and conveyed into a lower chamber of the pressure reactor vessel and then installed by the CRD remotely replacing means.

The CRD disassembling and washing operation will now be described in more detail with reference to FIGS. 19 to 32.

Figure 19:
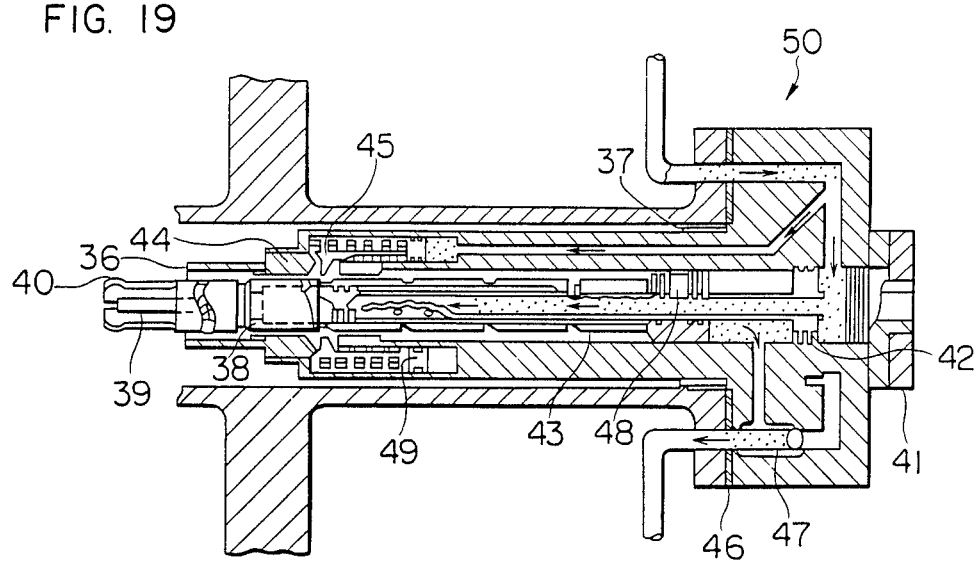
FIG. 19 is a schematic sectional view of CRD.

A CRD generally has a structure shown in FIG. 19.

Figure 20:
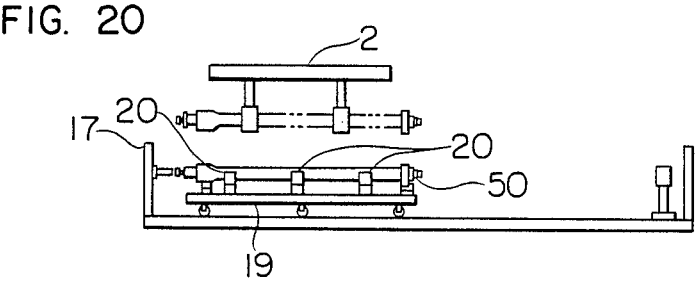
FIGS. 20 to 32 are views intended to explain the operation of the CRD cleaning apparatus in accordance with the invention.

First of all, the CRD body 50 is conveyed onto the CRD loading truck 19 by the CRD handling means 2 and the CRD on the truck 19 is then clamped by the CRD clamping unit 20 (FIG. 20).

Figure 21:
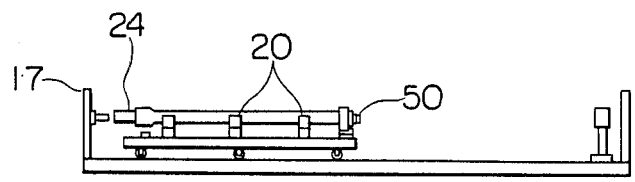
Figure 22:
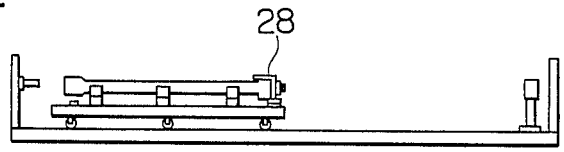

The filter washing unit 24 is rocked to the filter position. The CRD loading truck 19 is caused to travel, whereby, as shown in FIG. 11, an outer filter 36 and an inner filter 38 are covered by the cap 22. Then, the washing water is ejected from the nozzle assembly 53 to wash these filters 36 and 38 (FIG. 21). The strainer of CRD is washed with the washing water ejected from the nozzle unit 28 (FIG. 22). These washing operations are all performed under remote control, so that the operator is protected against the radiation exposure.

The outer filter 36 and inner filter 38 of CRD thus washed, and an uncoupling rod 39, coupling spud 40 and ring-like flange 41 of CRD simultaneously washed, are manually demounted from the CRD body. The elements thus demounted are conveyed to the ultrasonic cleaning tub 7.

Figure 23:
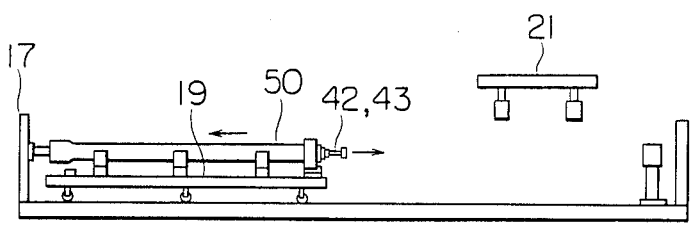

After the ring flange 41 has been demounted, respective portions of a piston tube 42 and an index tube 43 are drawn out (FIG. 23).

Figure 24:
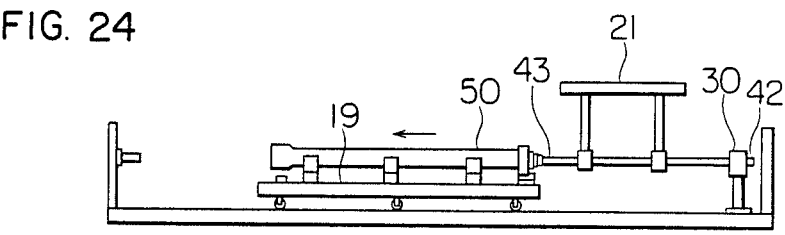

The CRD loading truck 19 is travelled rightwards, whereby the drawn out portion of the piston tube 42 is clamped by the drawing-out/clamping unit 30. The truck 19 is caused to travel leftwards. Thus, the piston tube 42 and index tube 43 are drawn out and, at the same time, the drawn-out index tube 43 (having the piston tube 42 in its interior) is clamped by the grapple unit 21 and is thereby moved to a position becoming no hindrance to the subsequent operations (FIG. 24). This drawing-out and clamping operation also is carried out under remote control.

Subsequently to the drawing-out of the piston tube 42 and index tube 43, a guide cap 44 and a collet assembly 45 are demounted and then, while the clamp unit 20 is being kept in a state of unclamping, a strainer 37, O-ring spacer 46 and ball retainer 47 are taken out. The members or small parts thus taken out are conveyed to the ultrasonic cleaning tub 7 (FIG. 25).

Figure 25:
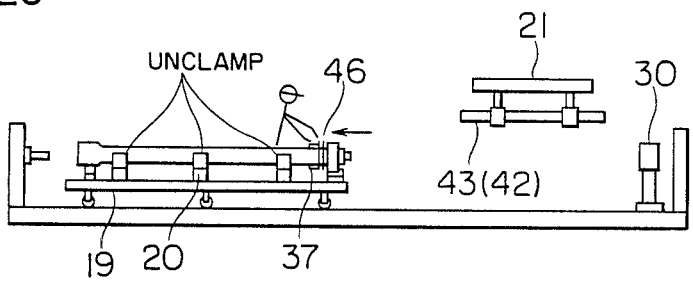

Although this operation is manually performed, the workmen are less subjected to exposure to radioactive rays because it is so done, as shown in FIG. 25, at the leftward position of the water tub 17 which is far away from the index tube 43, etc. suffering from radioactive contamination.

Figure 26:
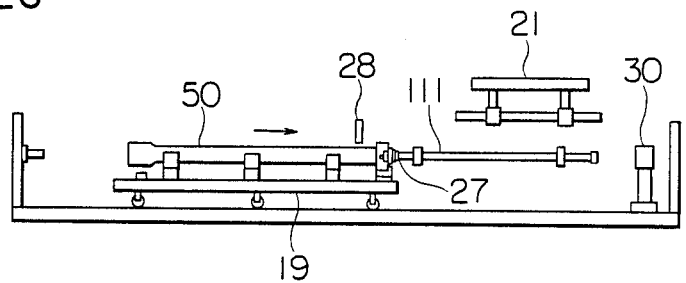
Figure 27:
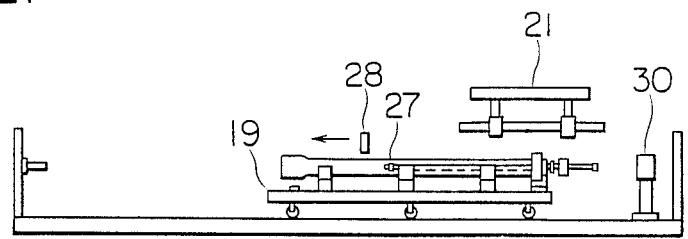
Figure 28:
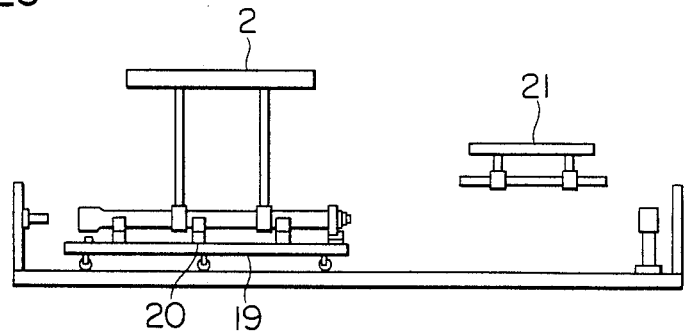
Figure 29:
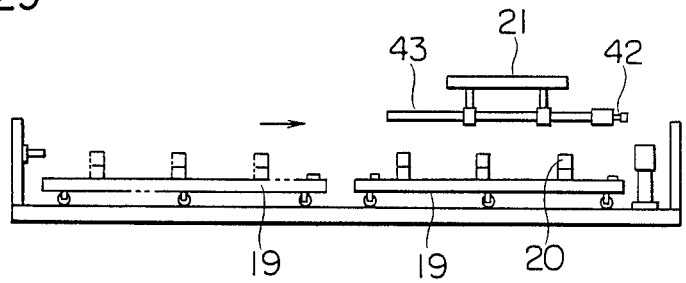
Figure 30:
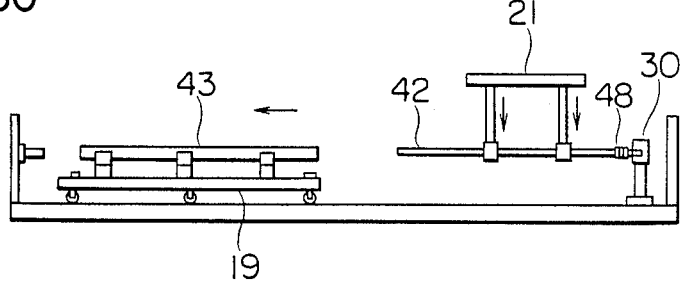
Figure 31:
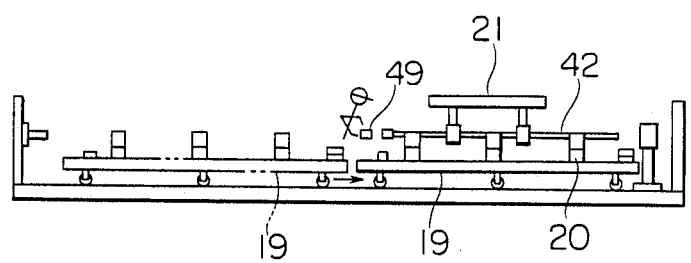
Figure 32:
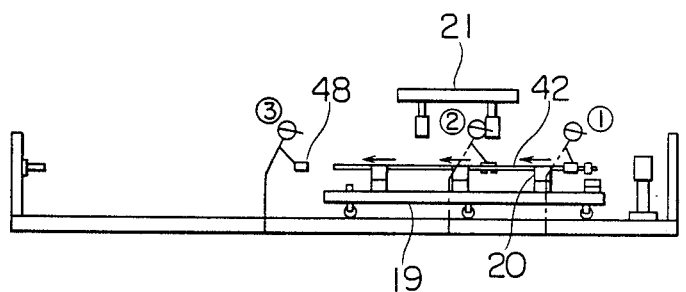

Next, the CRD body is clamped by the clamp unit 20 and the truck 19 travels rightwards, whereby high pressure water is ejected from the outer surface washing nozzle 28 and the inner surface washing nozzle 27 of the lance 111 to perform the washing operation (FIGS. 26 to 27). Then, the truck 19 travels leftwards, and the CRD body is unclamped. Then, the CRD body is conveyed to a drying tub unit by the CRD handling means 2 (FIG. 28). The truck 19 is then caused to travel rightwards. The index tube 43 (having the piston tube 42 in its interior) kept clamped by the grapple unit 21 is transferred on to the truck 19. Then, the piston tube 42 received in the index tube 43 is clamped by the drawing-out/clamp unit 30 (FIG. 29). The piston tube 42 is drawn out from the index tube 43 in the same manner as the index tube 43 has been drawn out from the CRD body (FIG. 30). The index tube 43 is washed in the same manner as in the case of washing the CRD body, and then is conveyed to the drying tub unit. The piston tube 42 clamped by the grapple unit 21 is unclamped and transferred onto the truck 19 and is clamped by the drawing-out/clamp unit 30. Thereafter, a stop piston 49 is manually demounted (FIG. 31). The drawing-out/clamp unit 30 is actuated to open its clamping jaws and, in this state, a drive piston 48 is manually demounted (FIG. 32). The piston tube 42 is washed in the same manner as in washing the CRD body and index tube 43. Then, it is conveyed to the drying tub unit.

Figure 33:
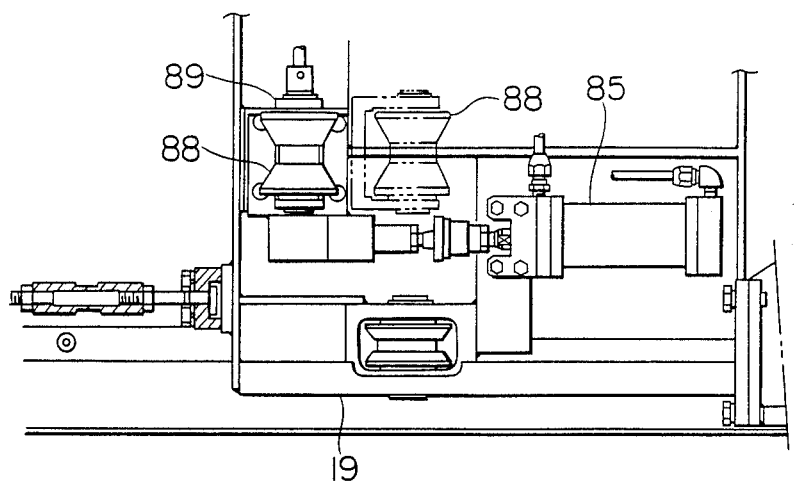
FIG. 33 is a plan view of a CRD placement means.
Figure 34:
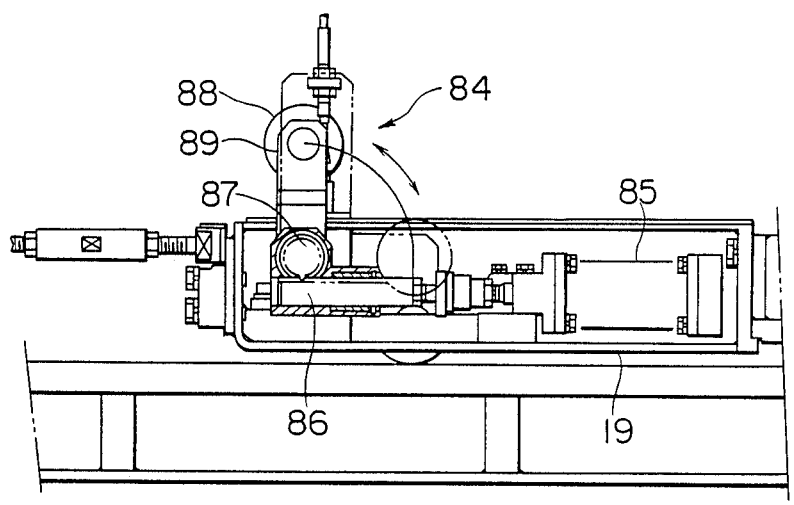
FIG. 34 is a front view of the CRD placement means.

Since the CRD disassembling and washing operations are for the most part performed by the remote controlled operation, it is possible to reduce the working time period, number of workmen and amount of radiation exposure onto them.

Where CRD is transferred onto the CRD loading truck 19, it may be retained beforehand on a retaining base 84 shown in FIGS. 33 and 34 and thereafter be clamped by the clamp unit 20. This retainer 84 is used to temporarily receive the CRD on the truck 19. It comprises an air cylinder 85, a rack and pinion mechanism and bracket. The reciprocating motion of the air cylinder 85 is converted into a rotary motion by cooperation of the rack 86 and pinion 87. The bracket 89 rotatably provided with a roller 88 is integrally fixed to the pinion 87. For this reason, the bracket is rocked by operation of the air cylinder 85 in a direction shown in FIG. 34 by an arrow. The position indicated in two-dot and dash line is a "reception" position, and the position indicated in solid line is a "retreatment" position. After the CRD has been clamped by the clamp unit 20, the bracket 89 of the retainer 84 is caused to return to its "retreatment"

position so as not to hinder the rotation and washing of the article to be washed.

The CRD handling means 2 and the grapple unit 21 are both intended to move or transfer and handle the CRD and have a common function. Therefore, even when the CRD cleaning apparatus is equipped with only one of these instruments, it has a construction which enables the CRD to be washed, disassembled and assembled.

In the CRD dismounting/washing operation performed in accordance with the above-mentioned operational steps, the working operation can be carried out by two persons one of which is an apparatus operator and his assistant. Further, since small parts are manually dismounted and large parts are automatically dismounted and washed under remote control, it is possible to reduce the labour of the workmen.

The present invention is directed to what have been stated above. Thus, by adopting the present invention, the following effects are obtained as compared with the existing cleaning operations.

| Term of operations |  |
| Number of Workmen |  |
| Amount of radiation exposure |  |

We claim:

1. A cleaning apparatus for an atomic reactor control rod driving means (CRD) which has been radioactively contaminated comprising a water tub having two ends for washing a CRD, rails laid within said water tub, a truck for loading said CRD installed on said rails, a CRD clamp unit mounted on said truck having means for rotating said CRD in the circumferential direction as well as for clamping said CRD, a CRD disassembling and assembling grapple unit installed within said water tub to clamp said CRD and move the same sideways, an outer-surface washing nozzle for washing on outer tube surface and strainer of said CRD, a lance installed within said water tub being insertable into the tubes of said CRD and being equipped with a nozzle assembly to spray the washing water onto the inner surface of said tubes, a filter washing nozzle unit installed within said water tub to spray the washing water onto a cylindrical filter of said CRD, a washing water recirculating pipe connected to said two ends of said water tub for recirculating the washing water back into said water tub, and a filter unit provided on a portion of the recirculating pipe to filter the washing water, said filter unit including shielding means for confining the radioactive contamination from the CRD entrained in the washing water therein so as to prevent radioactive exposure to the surrounding environment wherein said water tub is an elongated tub having a bottom member, oppposing said walls and opposing end walls, said filter washing nozzle unit being mounted adjacent only one side wall of said water tub and being pivotable about an axis extending in the elongated direction of said water tub, said filter washing nozzle unit including a cap member for substantially enclosing said cylindrical filter of said CRD and having disposed at the interior thereof a washing water ejecting nozzle and wherein said cap member is a substantially unitary member arranged for pivoting movement from a position adjacent said one side wall to a substantially central position of said water tub and for enclosing said filter therein at the central position, said filter washing nozzle unit being disposed adjacent one end wall of said water tub.

2. A cleaning apparatus according to claim 1, wherein said cleaning apparatus further comprises a CRD handling means installed above said water tub to travel in the lengthwise and widthwise directions, said CRD handling means able to grip and convey the CRD and its parts.

3. A cleaning apparatus for atomic reactor control rod driving means (CRD) which has been radioactively contaminated comprising a water tub having two ends for washing a CRD, rails laid within said water tub, a truck for loading the CRD installed on said rails, a CRD clamp unit mounted on said truck having means for rotating said CRD in the circumferential direction as well as for clamping said CRD, a CRD disassembling and assembling grapple unit installed within said water tub, to clamp said CRD and move the same sideways, a strainer washing nozzle unit having a cover for enclosing a strainer of said CRD and a nozzle assembly installed within said cover, an outer-surface washing nozzle for washing an outer tube surface, a lance installed within said water tub being insertable into the tubes of said CRD and being equipped with a nozzle assembly to spray the washing water onto the inner surface of said tubes, a filter washing nozzle unit installed within said water tub to spray the washing water onto a cylindrical filter of said CRD, a washing-water recirculating pipe connected to said two ends of said water tub for recirculating the washing water back into said water tub, and a filter unit provided on a portion of said recirculating pipe to filter the washing water, said filter unit including shielding means for confining the radioactive contamination from the CRD entrained in the washing water therein so as to prevent radioactive exposure to the surrounding environment, wherein said water tub is an elongated tub having a bottom member, opposing side walls and opposing end walls, said filter washing nozzle unit being mounted adjacent only one side wall of said water tub and being pivotable about an axis extending in the elongated direction of said water tub, said filter washing nozzle unit including a cap member for substantially enclosing said cylindrical filter of said CRD and having disposed at the interior thereof a washing water ejecting nozzle, and wherein said cap member is a substantially unitary member arranged for pivoting movement from a position adjacent said one side wall to a substantially central position of said water tub and for enclosing said filter therein at the central position, said filter washing nozzle unit being disposed adjacent one end wall of said water tub.

4. A cleaning apparatus according to claim 3, wherein said cleaning apparatus further comprises a CRD handling means installed above said water tub to travel in the lengthwise and widthwise directions, said CRD handling means able to grip and convey the CRD and its parts.

* * * * *